(12) United States Patent
Kotera et al.

(10) Patent No.: US 8,673,517 B2
(45) Date of Patent: Mar. 18, 2014

(54) POLYMER ELECTROLYTE MEMBRANE COMPOSED OF A FLUORINATED PROTON CONDUCTIVE POLYMER AND A FLUORINATED REINFORCING MATERIAL

(75) Inventors: Seigo Kotera, Chiyoda-ku (JP); Tetsuji Shimohira, Chiyoda-ku (JP); Satoru Hommura, Chiyoda-ku (JP); Susumu Saito, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 638 days.

(21) Appl. No.: 12/483,315

(22) Filed: Jun. 12, 2009

(65) Prior Publication Data

US 2010/0009236 A1    Jan. 14, 2010

Related U.S. Application Data

(63) Continuation of application No. PCT/JP2007/073970, filed on Dec. 12, 2007.

(30) Foreign Application Priority Data

Dec. 14, 2006    (JP) .................................. 2006-336878

(51) Int. Cl.
*H01M 8/10* (2006.01)

(52) U.S. Cl.
USPC .............................. 429/492; 429/491; 521/27

(58) Field of Classification Search
None
See application file for complete search history.

(56) References Cited

U.S. PATENT DOCUMENTS

| 7,531,610 | B2 | 5/2009 | Kaneko et al. | |
| 2003/0096149 | A1* | 5/2003 | Koyama et al. | 429/33 |
| 2005/0130006 | A1 | 6/2005 | Hoshi et al. | |
| 2005/0214611 | A1 | 9/2005 | Hommura | |
| 2008/0138685 | A1* | 6/2008 | Kaneko et al. | 429/33 |
| 2008/0138686 | A1 | 6/2008 | Kotera et al. | |
| 2008/0193821 | A1 | 8/2008 | Shimohira et al. | |
| 2009/0004527 | A1 | 1/2009 | Shimohira et al. | |

FOREIGN PATENT DOCUMENTS

| EP | 1 285 688 A1 | 2/2003 | | |
| EP | 1 667 265 A1 | 6/2006 | | |
| EP | 1 914 824 A1 | 4/2008 | | |
| JP | 5-75835 | 10/1993 | | |
| JP | 6-231779 | 8/1994 | | |
| JP | 7-68377 | 7/1995 | | |
| JP | 2002-352819 | * 12/2002 | ............. | H01M 8/02 |
| JP | 2003-297394 | 10/2003 | | |
| JP | 2004-067880 | 3/2004 | | |
| JP | 2005-078895 | * 3/2005 | ............. | H01M 8/02 |

(Continued)

OTHER PUBLICATIONS

U.S. Appl. No. 12/533,667, filed Jul. 31, 2009, Hommura, et al.

(Continued)

*Primary Examiner* — Ula C Ruddock
*Assistant Examiner* — Tony Chuo
(74) *Attorney, Agent, or Firm* — Oblon, Spivak, McClelland, Maier & Neustadt, L.L.P.

(57) ABSTRACT

To provide a polymer electrolyte membrane for polymer electrolyte fuel cells having high mechanical strength and excellent dimensional stability when it contains water even when it is made thin and the concentration of ionic groups is increased so as to reduce the electrical resistance, and a membrane/electrode assembly providing high output and having excellent durability.

24 Claims, 1 Drawing Sheet

(56) References Cited

FOREIGN PATENT DOCUMENTS

| | | |
|---|---|---|
| JP | 2005-187629 | 7/2005 |
| JP | 2006-024389 | 1/2006 |
| JP | 2006-155924 | 6/2006 |
| JP | 2006-185832 | 7/2006 |
| WO | 2004-011535 | 2/2004 |
| WO | 2005-029624 | 3/2005 |
| WO | WO 2007/013533 A1 * | 2/2007 ............. H01M 8/02 |

OTHER PUBLICATIONS

U.S. Appl. No. 12/410,524, Mar. 25, 2009, Kaneko, et al.
U.S. Appl. No. 11/771,332, Jun. 29, 2007, Shimohira, et al.

* cited by examiner

POLYMER ELECTROLYTE MEMBRANE COMPOSED OF A FLUORINATED PROTON CONDUCTIVE POLYMER AND A FLUORINATED REINFORCING MATERIAL

TECHNICAL FIELD

The present invention relates to a polymer electrolyte membrane for polymer electrolyte fuel cells, and a membrane/electrode assembly.

BACKGROUND ART

A polymer electrolyte fuel cell is, for example, a stack of a plurality of cells each comprising a membrane/electrode assembly sandwiched between two separators. The membrane/electrode assembly comprises an anode and a cathode each having a catalyst layer and a polymer electrolyte membrane disposed between the anode and the cathode. For the polymer electrolyte membrane, a fluorinated proton conductive polymer such as a perfluorocarbon polymer having sulfonic groups is usually used. Further, the polymer electrolyte membrane is required to exhibit low electrical resistance.

In order to reduce the electrical resistance of a polymer electrolyte membrane, the polymer electrolyte membrane may be made thin. However, if the polymer electrolyte membrane is made thin, mechanical strength of the membrane decreases, whereby the membrane may be difficult to process or handle in production of a membrane/electrode assembly.

Further, the dimensions of the polymer electrolyte membrane are likely to increase in the lengthwise direction when the membrane contains water, thus leading to various drawbacks. For example, if the polymer electrolyte membrane is swelled by e.g. water formed by the reaction or water vapor supplied with a fuel gas and its dimensions increase, the electrode will follow the change of the dimensions of the polymer electrolyte membrane. However, since the membrane/electrode assembly is bound by e.g. separators, the increase in dimensions of the polymer electrolyte membrane leads to "wrinkles". And grooves of the separators may be clogged with the wrinkles whereby the gas flow is impaired in some cases.

As a polymer electrolyte membrane having high mechanical strength even if it is thin and having excellent dimensional stability when it contains water, a polymer electrolyte membrane reinforced with a reinforcing material (e.g. porous body, fibrils, woven fabric or nonwoven fabric) has been proposed (Patent Documents 1 to 5).

In recent years, further decrease in the electrical resistance of a polymer electrolyte membrane has been desired. In order to further decrease the electrical resistance of a polymer electrolyte membrane, the concentration of ionic groups such as sulfonic groups contained in the fluorinated proton conductive polymer may be increased. However, if the concentration of ionic groups is significantly increased, the water content of the polymer electrolyte membrane per unit volume will significantly increase. This means that the change in the volume of the electrolyte membrane itself increases relative to the change in humidity of hydrogen gas or air assumed in practical operation of a fuel cell, and as a result, the durability will decrease. This tends to be significant as the operation temperature increases, and such is a fatal problem for the recent tendency of an increase in the operation temperature.

Accordingly, so long as a conventional fluorinated proton conductive polymer is used, there are limitations to a decrease in the thickness of the polymer electrolyte membrane and to an increase in the concentration of ionic groups contained in the fluorinated proton conductive polymer for the purpose of reducing the electrical resistance while mechanical strength and dimensional stability of the polymer electrolyte membrane are maintained.

Patent Document 1: JP-B-5-75835 (Claims)
Patent Document 2: JP-B-7-68377 (Claims)
Patent Document 3: JP-A-6-231779 (Claims)
Patent Document 4: WO04/011535 (Claims)
Patent Document 5: JP-A-2003-297394 (Claims, paragraphs 0012 and 0026)

DISCLOSURE OF THE INVENTION

Object to be Accomplished by the Invention

The present invention provides a polymer electrolyte membrane for polymer electrolyte fuel cells having high mechanical strength and excellent dimensional stability when it contains water even when it is made thin and the concentration of ionic groups contained in a fluorinated proton conductive polymer is increased so as to reduce the electrical resistance, and a membrane/electrode assembly providing high output and having excellent durability.

Means to Accomplish the Object

The polymer electrolyte membrane for polymer electrolyte fuel cells of the present invention comprises a fluorinated proton conductive polymer and a fluorinated reinforcing material, wherein the fluorinated proton conductive polymer satisfies the following conditions (i) and (ii):

(i) the proton conductivity is at least 0.06 S/cm in an atmosphere at a temperature of 80° C. under a relative humidity of 50%, and (ii) it is a polymer having repeating units based on a vinyl ether type monomer with a mass (equivalent weight) of at most 400 per 1 mol of ionic groups and repeating units based on a perfluoromonomer (except for the above vinyl ether type monomer).

The membrane/electrode assembly for polymer electrolyte fuel cells of the present invention comprises the polymer electrolyte membrane for polymer fuel cells of the present invention interposed between an anode and a cathode.

Effects of the Invention

The polymer electrolyte membrane for polymer electrolyte fuel cells of the present invention has high mechanical strength and excellent dimensional stability when it contains water even when it is made thin and the concentration of ionic groups contained in a fluorinated proton conductive polymer is increased so as to reduce the electrical resistance.

The membrane/electrode assembly for polymer electrolyte fuel cells of the present invention provides high output and has excellent durability.

MEANINGS OF SYMBOLS

Figure 1:
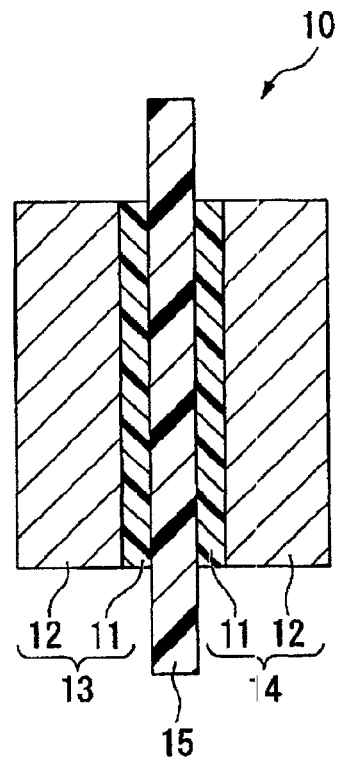
FIG. 1 is a cross-sectional view illustrating one example of the membrane/electrode assembly of the present invention.

10: Membrane/electrode assembly
11: Catalyst layer
13: Anode
14: Cathode
15: Polymer electrolyte membrane

BEST MODE FOR CARRYING OUT THE INVENTION

In the present specification, a group represented by the formula (α) will be referred to as group (α). The same applies to groups represented by other formulae. Further, a compound represented by the formula (1) will be referred to as compound (1). The same applies to compounds represented by other formulae.

<Polymer Electrolyte Membrane>

The polymer electrolyte membrane for polymer electrolyte fuel cells of the present invention (hereinafter referred to as a polymer electrolyte membrane) is a membrane comprising a fluorinated proton conductive polymer and a fluorinated reinforcing material.

The thickness of the polymer electrolyte membrane is preferably at most 100 μm, more preferably at most 50 μm, particularly preferably at most 30 μm. Further, the thickness of the polymer electrolyte membrane is preferably at least 5 μm, more preferably at least 20 μm. If the thickness of the polymer electrolyte membrane is at most 100 μm, the electrical resistance of the polymer electrolyte membrane can be made sufficiently low. Further, back diffusion of water formed on the cathode side is likely to occur. When the thickness of the polymer electrolyte membrane is at least 20 μm, mechanical strength tends to be high, whereby drawbacks such as gas leakage is less likely to occur.

The polymer electrolyte membrane preferably has a layer not reinforced with a fluorinated reinforcing material (hereinafter referred to as a non-reinforced layer) on at least one side of a layer reinforced with a fluorinated reinforcing material (hereinafter referred to as a reinforced layer), preferably on both sides of the reinforced layer, with a view to reducing the electrical resistance at a portion where the polymer electrolyte membrane and the electrode are in contact with each other.

The fluorinated proton conductive polymer in the non-reinforced layer may be the same as or different from the fluorinated proton conductive polymer in the reinforced layer.

The non-reinforced layer may contain a component excluding the fluorinated reinforcing material within a range not to increase the electrical resistance.

The thickness of the non-reinforced layer on one side is preferably from 1 to 20 μm, more preferably from 2 to 15 μm, particularly preferably from 2 to 10 μm in view of excellent fuel gas barrier properties and with a view to suppressing the electrical resistance.

The thickness of the non-reinforced layer is the minimum distance between the surface of the polymer electrolyte membrane and the fluorinated reinforcing material and is measured by observation of a cross section by e.g. an optical microscope, a laser microscope or SEM.

Movement of proton in the polymer electrolyte membrane is shutout by the fluorinated reinforcing material. If the non-reinforced layer is too thin, the distance required of the electrical current to avoid and bypass the fluorinated reinforcing material tends to be long, and such may cause an unnecessary increase of the electrical resistance. Particularly when non-woven fabric is used as the fluorinated reinforcing material, the increase in the electrical resistance is remarkable if the thickness of the non-reinforced layer is smaller than the half of the fiber size of the nonwoven fabric. When the thickness of the non-reinforced layer is at least half the fiber diameter of the non-woven fabric, the distance of the bypass for the electrical current will be short and resultingly, the unnecessary increase in the electrical resistance can be avoided.

(Fluorinated Proton Conductive Polymer)

The polymer electrolyte membrane comprises a fluorinated proton conductive polymer as a proton conductive polymer in view of excellent chemical durability and with a view to securing long-term stable performance. The ratio of the fluorinated proton conductive polymer is preferably 100 mass % in the proton conductive polymer (100 mass %).

The fluorinated proton conductive polymer is a polymer having fluorine atoms and ionic groups and satisfies the following conditions (i) and (ii).

(i) The proton conductivity is at least 0.06 S/cm in an atmosphere at a temperature of 80° C., under a relative humidity of 50%.

(ii) It is a polymer having repeating units based on a vinyl ether type monomer with a mass (g) (equivalent weight, hereinafter referred to as "EW") of at most 400 per 1 mol of ionic groups and repeating units based on a perfluoromonomer (except for the vinyl ether type monomer). Usually, a vinyl ether type monomer having an ionic group undergoes polymerization in the form of a precursor monomer having "a precursor group (such as —$SO_2F$ group) of an ionic group" which will become an ionic group (such as —$SO_3H$ group) by hydrolysis and conversion to an acid form, and the precursor groups are converted to ionic groups after the polymerization. Accordingly, in the present specification, the polymer having repeating units based on a vinyl ether type monomer having ionic groups includes a polymer obtained by polymerization using such a monomer having a precursor group and converting the precursor groups to ionic groups.

When the proton conductivity of the fluorinated proton conductive polymer is at least 0.06 S/cm, the Ω loss of the electrolyte membrane tends to be small in use as an electrolyte membrane for polymer electrolyte fuel cells and the power generation voltage will not remarkably decrease, whereby the electrolyte membrane can be used in a wide electric current density range. The proton conductivity of the fluorinated proton conductive polymer is preferably at least 0.07 S/cm, more preferably at least 0.08 S/cm.

When EW of the vinyl ether type monomer is at most 400, it is possible for a polymer having repeating units based on a vinyl ether type monomer and repeating units based on a perfluoromonomer to obtain a sufficiently high ionic group concentration even when the repeating units based on a vinyl ether type monomer are reduced. As a result, it is possible for the polymer to obtain sufficiently high mechanical strength as well as low electrical resistance. On the other hand, if EW is too low, the hydrophilic nature of the polymer is increased, whereby it is likely to be dissolved in water. EW of the vinyl ether type monomer is more preferably from 230 to 330. The ionic groups may, for example, be sulfonic groups, sulfonimide groups or sulfonmethide groups.

The repeating units based on a vinyl ether type monomer are preferably repeating units base on a monomer having a group (α). Hereinafter, a fluorinated proton conductive polymer having repeating units based on a monomer having a group (α) and repeating units based on a perfluoromonomer will be referred to as "polymer Q":

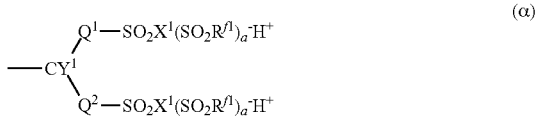
(α)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, "a" is 0 when $X^1$ is an oxygen atom, 1 when $X^1$ is a nitrogen atom, or 2 when $X^1$ is a carbon atom, and $Y^1$ is a fluorine atom or a monovalent perfluoroorganic group.

In a case where the perfluoroalkylene group as each of $Q^1$ and $Q^2$ has an etheric oxygen atom, the number of such an oxygen atom may be one or more. Further, such an oxygen atom may be inserted in the carbon atom-carbon atom bond of the perfluoroalkylene group or may be inserted into the terminal of the carbon atom bond.

The perfluoroalkylene group may be linear or branched, and is preferably linear.

The number of carbon atoms in the perfluoroalkylene group is preferably from 1 to 6, more preferably from 1 to 4. If the number of carbon atoms is too large, the boiling point of the fluoromonomer will be high, and purification will be difficult. Further, if the number of carbon atoms is too large, the ion exchange capacity of the polymer Q is lowered, and the proton conductivity is lowered.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability in power generation performance will be achieved when a polymer electrolyte fuel cell is operated over a long period of time as compared with a case where $Q^2$ is a single bond.

At least one of $Q^1$ and $Q^2$ is preferably a $C_{1-6}$ perfluoroalkylene group having an etheric oxygen atom. A fluoromonomer having a $C_{1-6}$ perfluoroalkylene group having an etheric oxygen atom can be prepared without fluorination reaction with a fluorine gas, and accordingly its production is easy with high yield.

The $—SO_2X^1(SO_2R^{f1})_a^-H^+$ group may be a sulfonic group (a $—SO_3^-H^+$ group), a sulfonimide group (a $—SO_2N(SO_2R^{f1})^-H^+$ group) or a sulfonmethide group (a $—SO_2C(SO_2R^{f1})_2^-H^+$ group).

The perfluoroalkyl group as $R^{f1}$ may be linear or branched, and is preferably linear. The number of carbon atoms of $R^{f1}$ is preferably from 1 to 6, more preferably from 1 to 4. $R^{f1}$ is preferably a perfluoromethyl group, a perfluoroethyl group or the like.

In the case of a sulfonmethide group, two $R^{f1}$ may be the same groups or different groups.

$Y^1$ is preferably a fluorine atom or a $C_{1-6}$ linear perfluoroalkyl group which may have an etheric oxygen atom.

Repeating units based on a perfluoromonomer are preferably repeating units based on tetrafluoroethylene (hereinafter referred to as TFE) in view of mechanical strength and chemical durability of the polymer electrolyte membrane. Further, they are also preferably repeating units based on two or more perfluoromonomers including TFE. Further, the polymer Q may contain repeating units based on a monomer which is not a perfluoromonomer.

The repeating units based on a perfluoromonomer other than TFE and repeating units based on a monomer which is not a perfluoromonomer which may be contained in the polymer Q will be hereinafter referred to as "repeating units based on another monomer".

The repeating units based on another monomer may be repeating units based on a monomer having no ionic group and repeating units based on a monomer having an ionic group. The monomer having no ionic group may, for example, be chlorotrifluoroethylene, vinylidene fluoride, hexafluoropropylene, trifluoroethylene, vinyl fluoride, ethylene or compounds (n1) to (n3):

(n1)

(n2)

(n3)

wherein $R^{f2}$ is a $C_{1-12}$ perfluoroalkyl group which may have at least one etheric oxygen atom, and $R^{f3}$ is a $C_{1-12}$ perfluoroalkyl group.

The monomer having an ionic group may, for example, be a compound (n4):

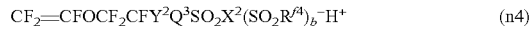
(n4)

wherein $Q^3$ is a single bond or a perfluoroalkylene group which may have at least one etheric oxygen atom, $R^{f4}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom and 2 when $X^2$ is a carbon atom, and $Y^2$ is a fluorine atom or a monovalent perfluoroorganic group.

The repeating units based on another monomer are preferably repeating units based on the compound (n1) and repeating units based on the compound (n4) since the polymer electrolyte membrane is thereby less likely to be broken even when it undergoes repetition of swelling in a wet state and shrinkage in a dry state.

The polymer Q is preferably a perfluoropolymer in view of chemical durability of the polymer electrolyte membrane, and accordingly when it contains repeating units based on another monomer, such another monomer is preferably a perfluoromonomer.

The polymer Q is preferably a polymer comprising from 5 to 25 mol % of repeating units based on a monomer having a group (α), from 50 to 95 mol % of repeating units based on TFE and from 0 to 25 mol % of repeating units based on another monomer in the polymer Q (100 mol %).

The polymer Q can be produced, for example, by the following steps.

(I) A step of polymerizing a monomer having a group (β) (hereinafter referred to as compound (m1)) and a perfluoromonomer and another monomer as the case requires to obtain a precursor polymer having $—SO_2F$ groups (hereinafter referred to as polymer (P)):

(β)

wherein $Q^1$, $Q^2$ and $Y^1$ are as defined for the above group (α).

In a case where another monomer is a monomer having an ionic group, it is used in the form of a precursor monomer having a $SO_2F$ group which is the precursor of the ionic group.

(II) A step of bringing polymer P into contact with fluorine gas as the case requires to fluorinate unstable terminal groups of polymer P.

(III) A step of converting the —SO$_2$F groups of polymer P to sulfonic groups, sulfonimide groups or sulfonmethide groups to obtain polymer Q.

Step (I):

The compound (m1) can be obtained, for example, by Preparation Example described in after-mentioned Example 1.

The polymerization method may be a known polymerization method such as a bulk polymerization method, a solution polymerization method, a suspension polymerization method or an emulsion polymerization method.

The polymerization is carried out under conditions under which radicals will form. As a method of forming radicals, irradiation with radiation rays such as ultraviolet rays, γ rays or electron rays or addition of an initiator may, for example, be mentioned.

The polymerization temperature is usually from 20 to 150° C.

The initiator may, for example, be a bis(fluoroacyl)peroxide, a bis(chlorofluoroacyl)peroxide, a dialkyl peroxydicarbonate, a diacyl peroxide, a peroxyester, an azo compound or a persulfate, and with a view to obtaining a precursor polymer P having a small number of unstable terminal groups, preferred is a perfluoro compound such as a bis(fluoroacyl) peroxide.

A solvent to be used in the solution polymerization method may, for example, be a polyfluorotrialkylamine compound, a perfluoroalkane, a hydrofluoroalkane, a chlorofluoroalkane, a fluoroolefin having no double bond at the polymer terminals, a polyfluorocycloalkane, a polyfluorocyclic ether compound, a hydrofluoroether, a fluorine-containing low molecular weight polyether or t-butanol.

Step (II):

The unstable terminal group is a group formed by the chain transfer reaction, a group derived from the radical initiator, or the like, and specifically it is a carbonyl group, a —CF═CF$_2$ group, a —COF group, a —CF$_2$H group or the like. By fluorinating such unstable terminal groups, decomposition of polymer Q will be suppressed.

The fluorine gas may be diluted with an inert gas such as nitrogen, helium or carbon dioxide or may be used as it is without being diluted.

The temperature at which polymer P and the fluorine gas are brought into contact with each other is preferably from room temperature to 300° C., more preferably from 50 to 250° C., furthermore preferably from 100 to 220° C., particularly preferably from 150 to 200° C.

The time over which polymer P and the fluorine gas are in contact with each other is preferably from one minute to one week, more preferably from 1 to 50 hours.

Step (III):

For example, in a case where the —SO$_2$F groups are converted to sulfonic acid groups, step (III-1) is carried out, and when the —SO$_2$F groups are converted to sulfonimide groups, step (III-2) is carried out.

(III-1) A step of hydrolyzing the —SO$_2$F groups of polymer P into a sulfonate, and converting the sulfonate to an acid form to obtain sulfonic acid groups.

(III-2) A step of sulfonimidizing the —SO$_2$F groups of polymer P into sulfonimide groups Step (III-1):

The hydrolysis is carried out, for example, by bringing polymer P and a basic compound into contact with each other in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethyl sulfoxide.

The conversion to an acid form is carried out, for example, by bringing polymer P having —SO$_2$F groups hydrolyzed, into contact with an aqueous solution of e.g. hydrochloric acid or sulfuric acid.

The hydrolysis and the conversion to an acid form are carried out usually at from 0 to 120° C.

Step (III-2):

As the sulfonimidization, a known method such as a method disclosed in the specification of U.S. Pat. No. 5,463, 005 or a method disclosed in Inorg. Chem. 32(23), p. 5,007 (1993) may, for example, be mentioned.

The ion exchange capacity of the fluorinated proton conductive polymer is preferably from 0.5 to 2.0 meq/g dry polymer, more preferably from 0.7 to 1.6 meq/g dry polymer. When the ion exchange capacity is at least 0.5 meq/g dry polymer, the electrical resistance of the polymer electrolyte membrane can be sufficiently low. When the ion exchange capacity is at most 2.0 meq/g dry polymer, the hydrophilic nature of the polymer can be suppressed, whereby the polymer electrolyte membrane will not be dissolved at the time of power generation.

Further, the fluorinated proton conductive polymer preferably has a glass transition point of at least 120° C. When it has a glass transition point of at least 120° C., it has excellent mechanical strength even in cell operation at 100° C. or above.

(Fluorinated Reinforcing Material)

The fluorinated reinforcing material may, for example, be a porous body, fibrils, woven fabric or nonwoven fabric made of a fluoropolymer, but the woven fabric is relatively expensive since its production process is complicated, and it is difficult to satisfy requirements for membrane thickness reduction in this application. Further, addition of short fibers such as fibrils gives a weak reinforcing effect as compared with other systems. Accordingly, particularly preferred is a fluorinated reinforcing material in the form of a porous body or in the form of nonwoven fabric.

Such nonwoven fabric is preferably nonwoven fabric comprising continuous fibers of a fluoropolymer having at least part of intersecting points of fibers fixed in view of development of strength as a reinforcing material.

The thickness of the nonwoven fabric is preferably at most 50 μm in view of the thickness of the polymer electrolyte membrane, more preferably at most 30 μm, particularly preferably at most 20 μm.

The unit weight of the nonwoven fabric is preferably from 5 to 50 g/m$^2$ (2.5 to 25 cc/m$^2$) in view of the reinforcing effect and reduction of the electrical resistance.

The continuous fibers mean fibers having an aspect ratio of at least 10,000. The fiber length is preferably at least 20 mm.

The fiber size (diameter) of the continuous fibers is preferably from 0.01 to 13 μm, more preferably from 0.01 to 5 μm, particularly preferably from 0.01 to 3 μm. When the fiber size is at least 0.01 μm, the tensile strength per fiber will be sufficient, whereby favorable handling properties will be obtained. When the fiber size is at most 13 μm, the proton movement will smoothly be carried out, whereby the increase in the electrical resistance by reinforcement will be suppressed. Further, the intersecting points of fibers per thickness will increase, whereby strength of the nonwoven fabric can be increased, and the dimensional stability of the polymer electrolyte membrane will improve. It is furthermore preferred that the fiber size (diameter) of the continuous fibers of the nonwoven fabric is from 0.01 to 13 μm and that the unit weight is from 5 to 50 g/m$^2$.

The fluoropolymer is preferably a homopolymer or a copolymer having at least one type of repeating units based on a fluoromonomer such as perfluoroolefin (e.g. TFE, hexafluoropropylene), chlorotrifluoroethylene or perfluoro(alkyl vinyl ether).

Such a homopolymer or a copolymer may, for example, be a TFE/perfluoro(alkyl vinyl ether) copolymer (PFA), an ethylene/TFE copolymer (ETFE), a TFE/hexafluoropropylene copolymer (FEP), polychlorotrifluordethylene (PCTFE), an ethylene/chlorotrifluoroethylene copolymer (ECTFE), a polyvinylidene fluoride polymer (PVdF) or a polyvinyl fluoride polymer (PVF).

Among such fluoropolymers, preferred is ETFE, PFA, FEP, PVdF or the like with which melt molding is possible, and particularly preferred is PFA or ETFE which is excellent in mechanical strength and moldability.

ETFE is more preferably one having a molar ratio of repeating units based on TFE/repeating units based on ethylene of from 70/30 to 30/70, more preferably from 65/35 to 40/60.

ETFE, PFA, FEP or PVdF may have repeating units based on a comonomer in a small amount. As such a comonomer, the following compounds may be mentioned.

Fluoroethylenes (except for TFE): $CF_2=CFCl$ and the like,

Fluoropropylenes: $CF_2=CFCF_3$, $CF_2=CHCF_3$ and the like,

Fluoroethylenes having a $C_{2-12}$ perfluoroalkyl group: $CF_3CF_2CF_2CF_2CH=CH_2$, $CF_3CF_2CF_2CF_2CF=CH_2$ an the like, Perfluorovinyl ethers: $R^{f5}(OCFX^3CF_2)_kOCF=CF_2$ (wherein $R^{f5}$ is a $C_{1-6}$ perfluoroalkyl group, $X^3$ is a fluorine atom or a trifluoromethyl group, and k is an integer of from 0 to 5) and the like, Perfluorovinyl ethers having a group readily convertible to a carboxyl group or a sulfonic group: $CH_3OC(=O)CF_2CF_2CF_2OCF=CF_2$, $FSO_2CF_2CF_2OCF(CF_3)CF_2OCF=CF_2$ and the like, and Olefins (except for ethylene): C3 olefins (such as propylene), C4 olefins (such as butylene and isobutylene) and the like.

The comonomer for ETFE is preferably $CF_3CF_2CF_2CF_2CH=CH_2$.

The comonomer for PFA is preferably $CF_3CF_2OCF=CF_2$, $CF_3CF_2CF_2OCF=CF_2$ or $CF_3CF_2CF_2OCF(CF_3)CF_2OCF=CF_2$.

The proportion of the repeating units based on the comonomer is preferably at most 30 mol %, more preferably from 0.1 to 15 mol %, furthermore preferably from 0.2 to 10 mol % to the repeating units (100 mol %) based on all the monomers constituting the fluoropolymer (ETFE, PFA, FEP or PVdF).

The melt flow rate (hereinafter referred to as MFR) of PFA is preferably from 40 to 300 g/10 min. In the case of forming fine fibers, productivity will improve when the pressure loss of a spinning nozzle is small, and accordingly it is more preferably at least 60 g/10 min. Further, since strength of the obtained fibers decrease if MFR is high, it is more preferably at most 150 g/10 min. MFR of PFA is measured in accordance with ASTM D3307.

MFR of ETFE is preferably at least 40 g/10 min. MFR of ETFE is measured in accordance with ASTM B3159.

As a method for producing the nonwoven fabric in a case where the fluoropolymer is a melt-moldable fluoropolymer such as PFA or ETFE, it is preferred to employ a melt-blown method. As compared with other methods for preparing nonwoven fabric wherein fibers are formed from a polymer, which are formed into nonwoven fabric, the melt-blown method has high productivity, since formation of the fibers and formation of the fabric can be carried out substantially simultaneously. Further, the fibers constituting the nonwoven fabric can be made very fine, and increase in the electrical resistance of the polymer electrolyte membrane by the reinforcement can be suppressed.

Preparation of the nonwoven fabric by the melt-blown method is carried out, for example, as follows.

Using an apparatus for producing melt-blown nonwoven fabric, a melt-moldable fluoropolymer is discharged from an outlet of a spinning nozzle in a molten state, and stretched and spun by a gas discharged from an outlet of a gas discharge nozzle disposed in the vicinity of the spinning nozzle, whereby continuous fibers can be obtained. Such continuous fibers are collected on an air-suction surface, whereby nonwoven fabric can be formed.

The air-suction surface may, for example, be a metal mesh put on a conveyor.

If intersecting points of the fibers are not fixed, handling or an operation such as winding tends to be difficult. When at least some of intersecting points of the fibers are fixed, the elastic modulus and strength as nonwoven fabric elemental substance can be obtained. As a result, a self-sustaining property of the nonwoven fabric itself will be developed, whereby the handling efficiency will be improved, and the production of a polymer electrolyte membrane having the nonwoven fabric will be easy.

As an embodiment wherein at least some of intersecting points of the fibers are fixed, the following embodiments are mentioned.

Embodiment 1

An embodiment wherein fibers are fused when the continuous fibers are collected and the nonwoven fabric is formed.

Embodiment 2

An embodiment wherein the fibers are fused by hot pressing of the nonwoven fabric.

Embodiment 3

An embodiment wherein the intersecting points of the fibers are bound by applying a solution containing a binder to the nonwoven fabric.

As a method of applying a solution containing a binder, spray coating is preferred.

The binder is preferably a fluoropolymer soluble in a solvent in view of excellent chemical durability. The polymer soluble in a solvent means a fluoropolymer with a solvent in which it is soluble, and means one which can exist as a solution having a concentration of at least 0.1% at room temperature. Further, the solution includes a liquid in which the fluoropolymer is present as dispersed or in a swollen state microscopically but is recognized as a solution macroscopically.

The fluoropolymer soluble in a solvent is preferably a perfluoropolymer in view of excellent chemical durability. As the fluoropolymer soluble in a solvent, the following polymers (A) to (C) may be mentioned.

(A) A fluoropolymer having ionic groups or precursor groups thereof in its molecule:

The ionic groups may, for example, be sulfonic groups or sulfonimide groups.

The precursor groups of the ionic groups may, for example, be —SO$_2$F groups.

The polymer (A) will be an electrolyte, will not decrease the porosity of the nonwoven fabric, and will not lead to an increase in the electrical resistance of the polymer electrolyte membrane. The polymer (A) may be the same as the fluorinated proton conductive polymer constituting the polymer electrolyte membrane.

The fluoropolymer having —SO$_2$F groups may be a copolymer having repeating units based on a compound (1') and repeating units based on TFE:

$$CF_2=CF(OCF_2CFY^3)_m-O_q-(CF_2)_n-SO_2F \qquad (1')$$

wherein Y$^3$ is a fluorine atom or a trifluoromethyl group, m is an integer of from 0 to 3, n is an integer of from 1 to 12, and q is 0 or 1.

The fluoropolymer having sulfonic groups may be a copolymer having the —SO$_2$F groups of the copolymer converted to sulfonic groups by hydrolysis or by conversion to an acid form.

The fluoropolymer having —SO$_2$F groups is soluble in a flon substitute solvent such as ASAHIKLIN AK-225 (manufactured by Asahi Glass Company, Limited), and the fluoropolymer having sulfonic groups is soluble in ethanol.

(B) A fluoropolymer having an alicyclic structure in its main chain and having substantially no ionic groups:

The polymer (B) may be a polymer having repeating units represented by any one of the following formulae (B1), (B2) and (B3). Such a polymer is soluble in perfluorobenzene, trifluoroethane, perfluoro(2-butyltetrahydrofuran), Fluorinert FC-77 (manufactured by Sumitomo 3M Limited) or the like.

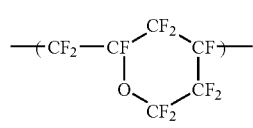
(B1)

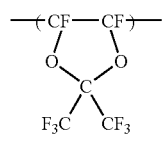
(B2)

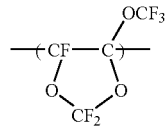
(B3)

(C) A fluoroolefin type fluoropolymer having substantially no ion exchange groups:

The polymer (C) may, for example, be a TFE/hexafluoropropylene/vinylidene fluoride copolymer; or a copolymer comprising repeating units based on at least one fluoroolefin monomer selected from the group consisting of TFE, hexafluoropropylene, vinylidene fluoride and chlorotrifluoroethylene, and repeating units based on at least one monomer selected from the group consisting of vinyl ether, vinyl ester, allyl ether, allyl ester, isopropenyl ether, isopropenyl ester, methacryl ether, methacryl ester, acrylate and methacrylate.

The polymer (C) is soluble in a ketone, an ester, a chloroethane, a benzene derivative and the like.

(Method for Producing Polymer Electrolyte Membrane)

As a method for producing the polymer electrolyte membrane, for example, the following methods may be mentioned.

(a-1) A cast method wherein the fluorinated reinforcing material is impregnated with a solution or dispersion containing the fluorinated proton conductive polymer, followed by drying to form a film.

(a-2) A method wherein a preliminarily formed membrane-form material containing the fluorinated proton conductive polymer is laminated on the fluorinated reinforcing material for integration.

The polymer electrolyte membrane may be strengthened by stretch treatment or the like as the case requires.

When this polymer electrolyte membrane has a non-reinforced layer on at least one side of the reinforced layer, as the method for producing the polymer electrolyte membrane, the following methods may, for example, be mentioned.

(b-1) A method wherein when the polymer electrolyte membrane is formed by the above method (a-1) or (a-2), the non-reinforced layer is simultaneously formed.

(b-2) A method wherein a solution or a dispersion containing the fluorinated proton conductive polymer is applied to the surface of the polymer electrolyte membrane (reinforced layer) obtained by the above method (a-1) or (a-2).

(b-3) A method wherein a preliminarily formed membrane-form material (non-reinforced layer) containing the fluorinated proton conductive polymer is laminated on the surface of the polymer electrolyte membrane (reinforced layer) obtained by the above method (a-1) or (a-2) for integration.

<Membrane/Electrode Assembly>

FIG. 1 is a cross-sectional view illustrating one example of the membrane/electrode assembly for polymer electrolyte fuel cells of the present invention (hereinafter referred to as a membrane/electrode assembly). The membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 interposed between the anode 13 and the cathode 14 in a state where it is in contact with the catalyst layers 11.

(Polymer Electrolyte Membrane)

The polymer electrolyte membrane 15 is a membrane comprising the fluorinated proton conductive polymer and the fluorinated reinforcing material as described above.

(Catalyst Layer)

The catalyst layer 11 is a layer containing a catalyst and a proton conductive polymer.

The catalyst may be a catalyst having platinum or a platinum alloy supported on a carbon support. The catalyst for the cathode 14 is preferably a catalyst having a platinum/cobalt alloy supported on a carbon support in view of durability.

The carbon support may be a carbon black powder, and preferably a carbon black powder graphitized by e.g. heat treatment in view of durability.

The proton conductive polymer may, for example, be polymer Q or another proton conductive polymer other than polymer Q, and polymer Q is preferred.

Such another proton conductive polymer may, for example, be another fluorinated proton conductive polymer other than polymer Q or a hydrocarbon polymer, and such another fluorinated proton conductive polymer is preferred in view of the durability.

Such another fluorinated proton conductive polymer is particularly preferably a copolymer having repeating units based on TFE and repeating units based on a fluoromonomer having a sulfonic group.

The fluoromonomer having a sulfonic group is preferably compound (1):

$$CF_2=CF(OCF_2CFY^4)_m-O_q-(CF_2)_n-SO_3H \quad (1)$$

wherein $X^4$ is a fluorine atom or a trifluoromethyl group, m is an integer of from 0 to 3, n is an integer of from 1 to 12, and q is 0 or 1.

The hydrocarbon polymer may, for example, be sulfonated polyarylene, sulfonated polybenzoxazole, sulfonated polybenzothiazole, sulfonated polybenzimidazole, sulfonated polysulfone, sulfonated polyethersulfone, sulfonated polyether ethersulfone, sulfonated polyphenylenesulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone or sulfonated polyimide.

The catalyst layer 11 may contain a water repellent with a view to increasing the effect of suppressing flooding. The water repellent may, for example, be a copolymer of TFE and hexafluoropropylene, a copolymer of TFE and perfluoro (alkyl vinyl ether) or polytetrafluoroethylene (hereinafter referred to as PTFE). The water repellent is preferably a fluoropolymer soluble in a solvent, with a view to easily carrying out water repellent treatment of the catalyst layer 11. The proportion of the water repellent is preferably from 0.01 to 30 mass % in the catalyst layer 11 (100 mass %).

(Gas Diffusion Layer)

The gas diffusion layer 12 may, for example, be carbon paper, carbon cloth or carbon felt.

The gas diffusion layer 12 is preferably subjected to water repellent treatment with e.g. PTFE.

(Carbon Layer)

Figure 2:
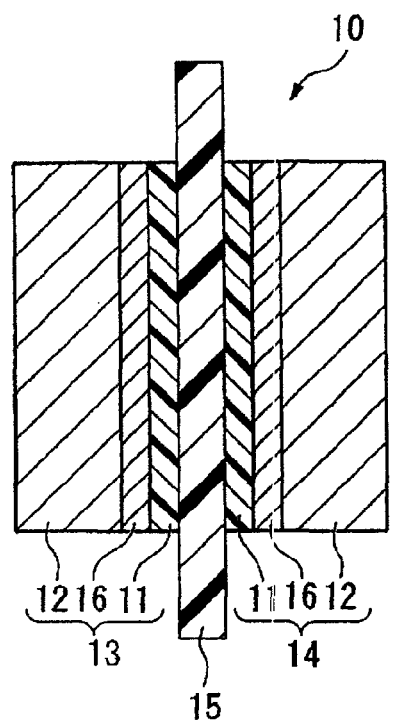
FIG. 2 is a cross-sectional view illustrating another example of the membrane/electrode assembly of the present invention.

The membrane/electrode assembly 10 may have carbon layers 16 each between the catalyst layer 11 and the gas diffusion layer 12 as shown in FIG. 2. By disposing the carbon layers 16, the gas diffusibility on the surface of the catalyst layers 11 will improve, whereby the power generation performance of the polymer electrolyte fuel cell will remarkably improve.

The carbon layer 16 is a layer containing carbon and a nonionic fluoropolymer.

The carbon is preferably carbon nanofibers having a fiber diameter of from 1 to 1,000 nm and a fiber length of at most 1,000 μm.

The nonionic fluoropolymer may, for example, be PTFE.

(Process for Producing Membrane/Electrode Assembly)

The membrane/electrode assembly 10 is produced, for example, by the following process.

(x-1) A process of forming catalyst layers 11 on a polymer electrolyte membrane 15 to prepare a membrane/catalyst layer assembly, and sandwiching the membrane/catalyst layer assembly between gas diffusion layers 12.

(x-2) A process of forming a catalyst layer 11 on a gas diffusion layer 12 to prepare electrodes (anode 13, cathode 14) and sandwiching a polymer electrolyte membrane 15 between the electrodes.

In a case where the membrane/electrode assembly 10 has carbon layers 16, the membrane/electrode assembly 10 is produced, for example, by the following process.

(y-1) A process of applying a dispersion liquid containing carbon and a nonionic fluoropolymer to a substrate film and drying the dispersion liquid to form a carbon layer 16, forming a catalyst layer 11 on the carbon layer 16, bonding such catalyst layers 11 and a polymer electrolyte membrane 15, separating the substrate films to prepare a membrane/catalyst layer assembly having carbon layers 16, and sandwiching the membrane/catalyst layer assembly between gas diffusion layers 12.

(y-2) A process of applying a dispersion liquid containing carbon and a nonionic fluoropolymer to a gas diffusion layer 12 and drying the dispersion liquid to form a carbon layer 16, and sandwiching a membrane/catalyst layer assembly in the process (x-1) between such gas diffusion layers 12 each having a carbon layer 16.

As a process for forming the catalyst layer 11, the following processes may be mentioned.

(z-1) A process of applying a liquid for forming a catalyst layer on a polymer electrolyte membrane 15, a gas diffusion layer 12 or a carbon layer 16 and drying the liquid.

(z-2) A process of applying a liquid for forming a catalyst layer on a substrate film and drying the liquid to form a catalyst layer 11, and transferring the catalyst layer 11 to a polymer electrolyte membrane 15.

The liquid for forming a catalyst layer is a liquid having a proton conductive polymer and a catalyst dispersed in a dispersion medium. The liquid for forming a catalyst layer may be prepared, for example, by mixing the liquid composition as mentioned below with a dispersion medium of the catalyst.

The viscosity of the liquid for forming a catalyst layer varies depending upon the process for forming a catalyst layer 11 and accordingly the liquid may be a dispersion liquid having a viscosity of several tens cP or may be a paste having a viscosity of about 20,000 cP.

The liquid for forming a catalyst layer may contain a thickener to adjust the viscosity. The thickener may be ethyl cellulose, methyl cellulose, a cellosolve thickener or a fluorinated solvent (such as pentafluoropropanol or flon).

The liquid composition is a dispersion liquid obtained by dispersing a proton conductive polymer in a dispersion medium containing an organic solvent having a hydroxyl group and water.

The organic solvent having a hydroxyl group is preferably an organic solvent in which the number of carton atoms in its main chain is from 1 to 4, and methanol, ethanol, n-propanol, isopropanol, tert-butanol or n-butanol may, for example, be mentioned. The organic solvents having a hydroxyl group may be used alone or as a mixture of two or more.

The proportion of water is preferably from 10 to 99 mass %, more preferably from 40 to 99 mass % in the dispersion medium (100 mass %). By increasing the proportion of water, it is possible to improve dispersibility of the proton conductive polymer in the dispersion medium.

The proportion of the organic solvent having a hydroxyl group is preferably from 1 to 90 mass %, more preferably from 1 to 60 mass % in the dispersion medium (100 mass %).

The dispersion medium may contain a fluorinated solvent. The fluorinated solvent may, for example, be hydrofluorocarbon, fluorocarbon, hydrochlorofluorocarbon, fluoroether or a fluorinated alcohol.

The proportion of the proton conductive polymer is preferably from 1 to 50 mass %, more preferably from 3 to 30 mass % in the liquid composition (100 mass %).

<Polymer Electrolyte Fuel Cell>

The membrane/electrode assembly of the present invention may be used for a polymer electrolyte fuel cell. A polymer electrolyte fuel cell is prepared, for example, by sandwiching a membrane/electrode assembly between two separators to form a cell, and stacking a plurality of such cells.

The separator may, for example, be an electrically conductive carbon plate having grooves formed to constitute flow paths for a fuel gas or an oxidant gas containing oxygen (such as air or oxygen).

As a type of the polymer electrolyte fuel cell, a hydrogen/oxygen type fuel cell or a direct methanol type fuel cell (DMFC) may, for example, be mentioned.

The above explained polymer electrolyte membrane 15 comprises a fluorinated proton conductive polymer which satisfies the above conditions (i) and (ii) and a fluorinated reinforcing material. Accordingly, it is excellent in dimensional stability when it contains water even when it is made thin and the concentration of ionic groups contained in the fluorinated proton conductive polymer is increased so as to reduce the electrical resistance. The reasons are as follows.

In a case where a conventional fluorinated proton conductive polymer is used, the electrical resistance can be reduced to a certain extent by making the polymer electrolyte membrane thin while maintaining the dimensional stability of the polymer electrolyte membrane by reinforcement with a reinforcing material. However, if the concentration of ionic groups contained in the fluorinated proton conductive polymer is increased so as to further reduce the electrical resistance of the polymer electrolyte membrane, the dimensional stability of the polymer electrolyte membrane can not be maintained even by reinforcement with a reinforcing material.

On the other hand, in the present invention, the fluorinated proton conductive polymer has repeating unit based on a vinyl ether type monomer having EW of at most 400, and accordingly a sufficiently high ionic group concentration can be obtained even if the repeating units based on a vinyl ether type monomer are reduced. Accordingly, the repeating units based on a perfluoromonomer can be increased and as a result, a polymer electrolyte membrane 15 excellent in dimensional stability when it contains water can be formed even though it is thin and the concentration of the ionic groups contained in the fluorinated proton conductive polymer is high.

Further, since a sufficiently high ionic group concentration can be obtained even when the amount of the repeating units based on a vinyl ether type monomer is small, the proton conductivity of the fluorinated proton conductive polymer in an atmosphere at a temperature of 80° C. under a relative humidity of 50% can be made at least 0.06 S/cm and as a result, the electrical resistance of the polymer electrolyte membrane 15 can be made low.

Further, the above-described membrane/electrode assembly 10 has, as the polymer electrolyte membrane, a polymer electrolyte membrane 15 having high mechanical strength and excellent dimensional stability when it contains water even when it is made thin and the concentration of ionic groups contained in the fluorinated proton conductive polymer is high so as to reduce the electrical resistance, and accordingly it provides high output and is excellent in durability.

EXAMPLES

Now, the present invention will be described in detail with reference to Examples. However, it should be understood that the present invention is by no means restricted to such specific Examples.

Examples 1 to 8 are Preparation Examples, Examples 9 to 17 are Production Examples, Examples 18 to 25 and 30 to 38 are Examples of the present invention, and Examples 26 to 29, 39 and 40 are Comparative Examples.

(Ion Exchange Capacity)

The ion exchange capacity (AR) of polymer P was obtained by the following method.

Regarding each of 200 μm films made of two types of polymers (a polymer having AR of 1.0 and a polymer having AR of 1.1) in which AR was preliminarily determined by titration, the peak intensity based on a sulfur atom was measured by using a fluorescent X-ray (RIX3000, manufactured by Rigaku Corporation), and a calibration curve showing the relationship between the peak intensity and AR was prepared. Polymer P was pressed at a temperature of TQ value as mentioned below to prepare a 200 μm membrane, and its peak intensity based on a sulfur atom was measured by using the fluorescent X-ray, whereby AR was identified by the above calibration curve. (TQ Value)

The TQ value (unit: ° C.) indicates the molecular weight of the polymer and is a temperature at which the amount of the polymer extruded becomes 100 mm$^3$/sec when melt extrusion is carried out under an extrusion pressure of 2.94 MPa by using a nozzle with a length of 1 mm and an inner diameter of 1 mm.

An amount of polymer P extruded was measured by changing the temperature by using a flow tester CFT-500A (manufactured by Shimadzu Corporation) and the TQ value at which the amount extruded becomes 100 mm$^3$/sec was determined.

(Molar Ratio of Repeating Units)

The molar ratio of the repeating units constituting polymer P was determined by melt-state $^{19}$F-NMR.

(Proton Conductivity)

The proton conductivity of polymer Q was determined by the following method.

To a film of polymer Q with a width of 5 mm, a substrate having four-prove electrodes disposed thereon with a distance of 5 mm was closely contacted, and the resistance of the film was measured at an alternating current of 10 kHz at a voltage of 1 V under constant temperature and humidity conditions at a temperature of 80° C. with a relative humidity of 50% by a known 4-prove method, and the proton conductivity was calculated from the results.

(Softening Temperature, Glass Transition Temperature)

The softening temperature and the glass transition temperature of polymer Q were determined by the following method.

Using a dynamic viscoelasticity analyzer (DVA200, manufactured by ITK Co., Ltd.), the dynamic viscoelasticity of a film of polymer Q was measured under conditions with a sample width of 0.5 cm, a length of specimen between grips being 2 cm at a measuring frequency of 1 Hz at a temperature raising rate of 2° C./min, and the temperature at which the storage modulus becomes half the value at 50° C. was regarded as the softening temperature. Further, the glass transition temperature (Tg) was determined from the peak value of tan δ.

(The Unit Weight, Porosity and Fiber Diameter of Nonwoven Fabric)

A PET film with an adhesive was pressed on the nonwoven fabric to transfer the nonwoven fabric, and the unit weight of the nonwoven fabric was measured from the transferred area and the increase in the mass. Further, the thickness of the nonwoven fabric and the diameter of fibers were measured from a cross-sectional microscopic photograph. The porosity was calculated from the following formula:

$$\text{Porosity (\%)}=100-A\times100/(B\times C)$$

17

A: The unit weight (g/m$^2$) of a portion made of materials which are not an electrolyte among materials constituting the nonwoven fabric B: The density (g/m$^3$) of materials which are not an electrolyte among materials constituting the nonwoven fabric C: Thickness (m) of the nonwoven fabric (Thickness of Non-Reinforced Layer)

The cross section of the polymer electrolyte membrane was observed by a laser microscope to measure the minimum distance from the surface of the polymer electrolyte membrane to the fluorinated reinforcing material.

(Dimension Change (in Plane) when the Membrane Contains Water)

A 200 mm square sample was cut out from the polymer electrolyte membrane. The sample was exposed to an atmosphere at a temperature of 25° C. under a relative humidity of 50% for 16 hours, whereupon lengthwise and crosswise lengths of the sample were measured. Then, the sample was immersed in deionized water at 90° C. for 16 hours, whereupon the lengthwise and crosswise lengths were measured. The average of the elongation in the lengthwise direction and the elongation in the crosswise direction of the sample was determined to obtain the dimension change (in plane).

(Initial Cell Voltage)

As a separator, a carbon plate (groove width: 1 mm, land portion: 1 mm) having fine grooves for gas flow paths cut in a zigzag line was prepared.

Such separators were disposed on both outside surfaces of a membrane/electrode assembly, and a heater was further disposed on the outside of the separators to assemble a polymer electrolyte fuel cell with an effective membrane area of 25 cm$^2$.

The air and hydrogen were supplied to the cathode and the anode respectively at 0.15 MPa while the temperature of the polymer electrolyte fuel cell was maintained at 80° C. The respective gases were supplied to the respective electrodes in a state where they are humidified to a relative humidity of 50% by a humidifier. The cell voltages at electric current densities of 0.1 A/cm$^2$ and 1 A/cm$^2$ were respectively measured.

Example 1

Compound (m11) was prepared by the following synthetic route:

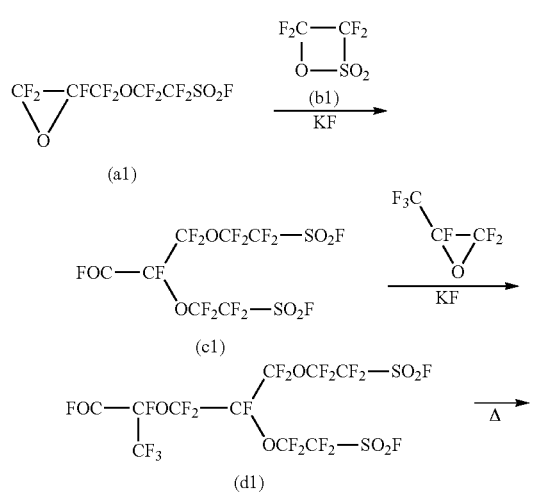

-continued

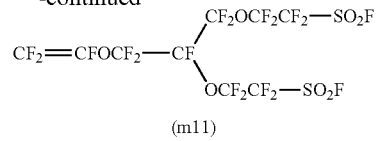

(m11)

(i) Preparation of Compound (a1):

Compound (a1) was prepared in the same manner as in the method as disclosed in Example 2 of JP-A-57-176973.

(ii) Preparation of Compound (c1):

To a 300 cm$^3$ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b1) was added dropwise from the dropping funnel over a period of 32 minutes at an internal temperature of at most 10° C. After completion of the dropwise addition, 82.0 g of compound (a1) was added dropwise from the dropping funnel over a period of 15 minutes. Substantially no increase in the internal temperature was observed. After completion of the dropwise addition, the internal temperature was recovered to room temperature, followed by stirring for about 90 minutes. The lower layer was recovered by a separatory funnel. The recovered amount was 127.6 g. The recovered liquid was put in a 200 cm$^3$ four-necked round bottom flask, followed by distillation to obtain 97.7 g of compound (c1) as a fraction at a degree of vacuum of from 1.0 to 1.1 kPa (absolute pressure). The gas chromatography (hereinafter referred to as GC) purity was 98%, and the yield was 80%.

(iii) Preparation of Compound (d1):

To a 200 cm$^3$ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of compound (c1) were put in the autoclave under reduced pressure. Then, the autoclave was cooled in an ice bath, 27.2 g of hexafluoropropene oxide was added over a period of 27 minutes at an internal temperature of from 0 to 5° C., and the internal temperature was recovered to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d1) as a fraction at a boiling point of 80 to 84° C./0.67 to 0.80 kPa (absolute pressure). The GC purity was 98%, and the yield was 56%.

(iv) Preparation of Compound (m11):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 34.6 g of compound (d1) was supplied to the fluidized bed type reactor over a period of 1.5 hours so that the molar ratio of compound (d1)/N$_2$ would be 1/20 while the reaction temperature was maintained at 340° C. After completion of the reaction, 27 g of a liquid was obtained by the liquid nitrogen trap. The GC purity was 84%. The liquid was subjected to distillation to obtain compound (m11) as a fraction at a boiling point of 69° C./0.40 kPa (absolute pressure). The GC purity was 98%.

$^{19}$F-NMR (282.7 MHz, solvent: CDCl$_3$, standard: CFCl$_3$) of compound (m11).

δ (ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Example 2

Preparation of Polymer P1:

The interior of an autoclave (internal capacity: 2,575 cm$^3$, made of stainless steel) was replaced with nitrogen, followed by sufficient deaeration. Under reduced pressure, 945.3 g of compound (m11), 425.7 g of compound (2-1) as a solvent, 164.3 g of compound (n11) and 654.2 mg of compound (3-1) (PEROYL IPP, manufactured by NOF CORPORATION) as an initiator were charged, and the autoclave was deaerated to the vapor pressure:

CClF$_2$CF$_2$CHClF                                                 (2-1)

CF$_2$=CFOCF$_2$CF(CF$_3$)OCF$_2$CF$_2$CF$_3$                     (n11)

(CH$_3$)$_2$CHOC(=O)OOC(=O)OCH(CH$_3$)$_2$                         (3-1)

The internal temperature was raised to 40° C., TFE was introduced to the autoclave, and the pressure was adjusted at 0.42 MPaG (gauge pressure). Polymerization was carried out for 7.0 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration:

CH$_3$CCl$_2$F                                                      (2-2).

The polymer was stirred in compound (2-1), and compound (2-2) was added to re-coagulate the polymer, followed by filtration. Such recoagulation was repeated twice. The polymer was dried under reduced pressure at 80° C. overnight, to obtain polymer P1 which is a copolymer of TFE, compound (m11) and compound (n11). The yield, the ion exchange capacity, the TQ value and the ratio of repeating units constituting the polymer are shown in Table 1.

Example 3

Preparation of Polymer P2:

The interior of an autoclave (internal capacity: 2,575 cm$^3$, made of stainless steel) was replaced with nitrogen, followed by sufficient deaeration. Under reduced pressure, 1,035.0 g of compound (m11), 414.0 g of compound (2-1) as a solvent, 80.1 g of compound (n11), 122.1 mg of methanol and 616.5 mg of compound (3-1) as an initiator were charged, and the autoclave was deaerated to the vapor pressure.

The internal temperature was raised to 40° C., TFE was introduced to the autoclave, and the pressure was adjusted at 0.46 MPaG (gauge pressure). Polymerization was carried out for 5.75 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer P2 which is a copolymer of TFE, compound (m11) and compound (n11). The yield, the ion exchange capacity, the TQ value and the ratio of repeating units constituting the polymer are shown in Table 1.

Example 4

Preparation of Polymer P3:

The interior of an autoclave (internal capacity: 2,575 cm$^3$, made of stainless steel) was replaced with nitrogen, followed by sufficient deaeration. Under reduced pressure, 1,127.9 g of compound (m11), 403.5 g of compound (2-1) as a solvent and 535.8 mg of compound (3-1) as an initiator were charged, and the autoclave was deaerated to the vapor pressure.

The internal temperature was raised to 40° C., TFE was introduced to the autoclave, and the pressure was adjusted at 0.41 MPaG (gauge pressure). Polymerization was carried out for 7.2 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer P3 which is a copolymer of TFE and compound (m11). The yield, the ion exchange capacity, the TQ value and the ratio of repeating units constituting the polymer are shown in Table 1.

Example 5

Preparation of Polymer P4:

The interior of an autoclave (internal capacity: 2,575 cm$^3$, made of stainless steel) was replaced with nitrogen, followed by sufficient deaeration. Under reduced pressure, 1,047.1 g of compound (m11), 123.5 g of compound (2-1) as a solvent, 614.3 g of compound (n41) and 358.3 mg of compound (3-2) as an initiator were charged, and the autoclave was deaerated to the vapor pressure:

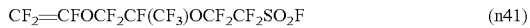

CF$_2$=CFOCF$_2$CF(CF$_3$)OCF$_2$CF$_2$SO$_2$F                     (n41)

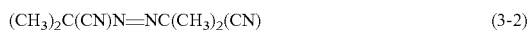

(CH$_3$)$_2$C(CN)N=NC(CH$_3$)$_2$(CN)                              (3-2)

The internal temperature was raised to 65° C., TFE was introduced to the autoclave, and the pressure was adjusted at 1.11 MPaG (gauge pressure). Polymerization was carried out for 11.0 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight, to obtain polymer P4 which is a copolymer of TFE, compound (m11) and compound (n41). The yield, the ion exchange capacity, the TQ value and the ratio of repeating units constituting the polymer are shown in Table 1.

Example 6

Preparation of Polymer P5:

The interior of an autoclave (internal capacity: 1,006 cm$^3$, made of stainless steel) was replaced with nitrogen, followed by sufficient deaeration. Under reduced pressure, 561.3 g of compound (m11), 96.0 g of compound (2-1) as a solvent, 43.3 g of compound (n11) and 476.5 mg of compound (3-2) as an initiator were charged, and the autoclave was deaerated to the vapor pressure.

The internal temperature was raised to 65° C., TFE was introduced to the autoclave, and the pressure was adjusted at 1.28 MPaG (gauge pressure). Polymerization was carried out for 4.5 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer P5 which is a copolymer of TFE, compound (m11) and compound (n11). The yield, the ion exchange capacity, the TQ value and the ratio of repeating units constituting the polymer are shown in Table 1.

Example 7

Preparation of Polymer P6:

The interior of an autoclave (internal capacity: 1,006 cm$^3$, made of stainless steel) was replaced with nitrogen, followed by sufficient deaeration. Under reduced pressure, 334.5 g of compound (m11), 103.2 g of compound (2-1) as a solvent, 239.4 g of compound (n41) and 542.6 mg of compound (3-2) as an initiator were charged, and the autoclave was deaerated to the vapor pressure.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer P6 which is a copolymer of TFE, compound (m11) and compound (n41). The yield, the ion exchange capacity, the TQ value and the ratio of repeating units constituting the polymer are shown in Table 1.

Example 8

Preparation of Polymer P7

The interior of an autoclave (internal capacity: 2,575 cm$^3$, made of stainless steel) was replaced with nitrogen, followed by sufficient deaeration. Under reduced pressure, 1,810.7 g of compound (n41) was charged, and further, 157.2 mg of solution (A) containing 4.9 mass % of compound (3-3) as a radical initiator was charged to compound (n41), and the autoclave was freeze-deaerated twice by liquid nitrogen:

$$(CF_3CF_2CF_2OCF(CF_3)CF_2OCF(CF_3)COO)_2 \quad (3\text{-}3)$$

The internal temperature was raised to 33° C., TFE was introduced to the autoclave, and the pressure was adjusted at 0.34 MPaG (gauge pressure). The mixture comprising 59.2 mg of the above solution (A) and 150 mg of compound (n41) was added 15 times every 30 minutes while the temperature and the pressure were maintained constant. After 15th addition, reaction was continued for 30 minutes, and 8.0 hours later, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such re-coagulation was repeated twice. The polymer was dried under reduced pressure at 80° C. overnight, to obtain polymer P7 which is a copolymer of TFE and compound (n41). The yield, the ion exchange capacity, the TQ value and the ratio of repeating units constituting the polymer are shown in Table 1.

TABLE 1

|  |  | Example 2 | Example 3 | Example 4 | Example 5 | Example 6 | Example 7 | Example 8 |
|---|---|---|---|---|---|---|---|---|
| Precursor polymer | | P1 | P2 | P3 | P4 | P5 | P6 | P7 |
| Yield (g) | | 188.1 | 174.4 | 180.0 | 265.0 | 87.0 | 85.0 | 71.0 |
| Ion exchange capacity (meq/g dry polymer) | | 1.45 | 1.58 | 1.81 | 1.51 | 1.33 | 1.35 | 1.50 |
| TQ value (° C.) | | 263 | 257 | 277 | 241 | 253 | 244 | 242 |
| Ratio of repeating units (mol %) | TFE | 83.7 | 84.2 | 82.7 | 82.9 | 88.1 | 85.2 | 68.9 |
| | m11 | 13.0 | 14.2 | 17.3 | 9.4 | 10.7 | 7.4 | 0 |
| | n11 or n41 | 3.3 | 1.6 | 0 | 7.7 | 1.2 | 7.4 | 31.1 |

The internal temperature was raised to 65° C., TFE was introduced to the autoclave, and the pressure was adjusted at 1.20 MPaG (gauge pressure). Polymerization was carried out for 6.5 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

Example 9

Preparation of Film of Polymer Q1:

Polymer P1 was treated by the following method to obtain a film of acid form polymer Q1.

First, polymer P1 was formed into a film with a thickness of from 100 to 200 μm by press molding at the TQ temperature of polymer P1.

Then, the above film was immersed in an aqueous solution containing 30 mass % of dimethyl sulfoxide and 15 mass % of potassium hydroxide at 80° C. for 16 hours to hydrolyze —SO₂F groups in the film thereby to convert these groups to —SO₃K groups.

Then, the above film was immersed in a 3 mol/L hydrochloric acid aqueous solution at 50° C. for 2 hours. The hydrochloric acid aqueous solution was exchanged, and the same treatment was further carried out four times. The film was sufficiently washed with deionized water to obtain a film of polymer Q1 having —SO₃K groups in the film converted to sulfonic groups.

The softening temperature, the glass transition temperature and the proton conductivity of the film of polymer Q1 were measured. The results are shown in Table 2.

Example 10

Preparation of Film of Polymer Q2:

A film of acid form polymer Q2 was obtained in the same manner as in Example 9 except that polymer P2 was used instead of polymer P1.

The softening temperature, the glass transition temperature and the proton conductivity of the film of polymer Q2 were measured. The results are shown in Table 2.

Example 11

Preparation of Film of Polymer Q3:

A film of acid form polymer Q3 was obtained in the same manner as in Example 9 except that polymer P3 was used instead of polymer P1.

The softening temperature, the glass transition temperature and the proton conductivity of the film of polymer Q3 were measured. The results are shown in Table 2.

Example 12

Preparation of Film of Polymer Q4:

A film of acid form polymer Q4 was obtained in the same manner as in Example 9 except that polymer P4 was used instead of polymer P1.

The softening temperature, the glass transition temperature and the proton conductivity of the film of polymer Q4 were measured. The results are shown in Table 2.

Example 13

Preparation of Film of Polymer Q5:

A film of acid form polymer Q5 was obtained in the same manner as in Example 9 except that polymer P5 was used instead of polymer P1.

The softening temperature, the glass transition temperature and the proton conductivity of the film of polymer Q5 were measured. The results are shown in Table 2.

Example 14

Preparation of Film of Polymer Q6:

A film of acid form polymer Q5 was obtained in the same manner as in Example 9 except that polymer P6 was used instead of polymer P1.

The softening temperature, the glass transition temperature and the proton conductivity of the film of polymer Q6 were measured. The results are shown in Table 2.

Polymers Q1 to Q6 have repeating units based on a vinyl ether type monomer having a sulfonic group, derived from repeating units based on monomer (m11). EW of the vinyl ether type monomer is 313.

Example 15

Preparation of Film of Polymer Q7:

A film of acid form polymer Q7 was obtained in the same manner as in Example 9 except that polymer P7 was used instead of polymer P1.

The softening temperature, the glass transition temperature and the proton conductivity of the film of polymer Q7 were measured. The results are shown in Table 2.

Example 16

Preparation of Film of Another Fluorinated Proton Conductive Polymer:

A film was obtained by a coating method using a solution (solid content: 20 mass %) of a commercially available fluorinated proton conductive polymer (Nafion R, manufactured by Dupont).

The proton conductivity of the film was measured. The result is shown in Table 2.

The fluorinated proton conductive polymer constituting Nafion R has repeating units based on compound (1-1). EW of compound (1-1) is 446.

$$CF_2\!=\!CFOCF_2CF(CF_3)OCF_2CF_2SO_3H \qquad (1\text{-}1)$$

Q7 and the fluorinated proton conductive polymer constituting Nafion R have repeating units based on compound (1-1). EW of compound (1-1) is 446.

TABLE 2

|  | Example 9 | Example 10 | Example 11 | Example 12 | Example 13 | Example 14 | Example 15 | Example 16 |
|---|---|---|---|---|---|---|---|---|
| Fluorinated proton conductive polymer | Q1 | Q2 | Q3 | Q4 | Q5 | Q6 | Q7 | Commercial product |
| Softening temperature (° C.) | 70 | 94 | 104 | 92 | 92 | 93 | 71 | 83 |
| Glass transition temperature (° C.) | 126 | 130 | 138 | 123 | 131 | 122 | 94 | 106 |
| Proton conductivity (S/cm) | 0.08 | 0.095 | 0.095 | 0.09 | 0.06 | 0.06 | 0.09 | 0.05 |
| EW (g) | 313 | 313 | 313 | 313 | 313 | 313 | 446 | 446 |

Example 17

Production of Nonwoven Fabric:

Using a melt-blown nonwoven fabric-producing apparatus (manufactured by Nippon Nozzle Co., Ltd.), using PFA (Fluon PFA P-61XP, manufactured by Asahi Glass Company, Limited, MFR: 40 g/10 min), a nonwoven fabric was formed on a conveyor having suction ability under conditions of the spinning nozzle temperature being 390° C. and the hot air temperature for stretching being 400° C.

PFA constituting the nonwoven fabric was continuous fibers, and the aspect ratios of all the fibers were at least 10,000. The nonwoven fabric with an area of 2.6 cm×2.6 cm was observed by a microscope, whereupon no fibers with fiber lengths of 13 mm or shorter were observed.

Then, a solution (solvent: CT-solv. 100, manufactured by Asahi Glass Company, Limited, solid content concentration: 2 mass %) of a fluoropolymer soluble in a solvent (CYTOP, manufactured by Asahi Glass Company, Limited, fluoropolymer having an alicyclic structure in its main chain) was sprayed on the nonwoven fabric using a hand sprayer to fix intersecting points of fibers constituting the nonwoven fabric. The fiber size of the continuous fibers was 7 μm, the thickness of the nonwoven fabric was 20 μm, and the unit weight was 10 g/m$^2$ (5 cc/m$^2$).

Example 18

Production of Polymer Electrolyte Membrane:

To polymer Q1, a mixed dispersion medium of ethanol, water and 1-butanol (ethanol/water/1-butanol=35/50/15 by mass ratio) was added to adjust the solid content concentration to 15 mass %, followed by stirring by using an autoclave at 125° C. for 8 hours. Water was further added to adjust the solid content concentration to 9 mass % to obtain a liquid composition S1 having polymer Q1 dispersed in a dispersion medium. The composition of the dispersion medium was ethanol/water/1-butanol=21/70/9 (mass ratio).

$Ce_2(CO_3)_3 \cdot 8H_2O$ in the number of mols corresponding to 5% of ionic groups in liquid composition S1 was added, followed by stirring at room temperature for 4 hours to obtain liquid composition S1'.

In a state where the edge of the nonwoven fabric was fixed, the nonwoven fabric was immersed in liquid composition S1' and pulled up at a rate of 100 mm per minute to impregnate the nonwoven fabric with liquid composition S1'. This operation for impregnation was repeated three times, and then the nonwoven fabric was dried at 55° C. for 1 hour in a state where it was fixed, to obtain a film for a reinforced layer.

Liquid composition S1' was applied to a polyethylene terephthalate film by die coating and dried at 140° C. for 1 hour to obtain a film for a non-reinforced layer with a thickness of 10 μm.

The film for a non-reinforced layer was disposed on both sides of the film for a non-reinforced layer, followed by hot pressing (180° C., 5 Pa, 15 minutes) to obtain polymer electrolyte membrane R1 with a thickness of 30 μm. The thickness of the non-reinforced layer on one side was 5 μm.

The dimension change (in plane) of polymer electrolyte membrane R1 was measured. The result is shown in Table 3.

Example 19

Production of Polymer Electrolyte Membrane:

Polymer electrolyte membrane R2 was obtained in the same manner as in Example 18 except that polymer Q2 was used instead of polymer Q1.

The dimension change (in plane) of polymer electrolyte membrane R2 was measured. The result is shown in Table 3.

Example 20

Production of Polymer Electrolyte Membrane:

Polymer electrolyte membrane R3 was obtained in the same manner as in Example 18 except that polymer Q3 was used instead of polymer Q1.

The dimension change (in plane) of polymer electrolyte membrane R3 was measured. The result is shown in Table 3.

Example 21

Production of Polymer Electrolyte Membrane:

Polymer electrolyte membrane R4 was obtained in the same manner as in Example 20 except that a stretched PTFE porous body (product code 1316, manufactured by Donaldson) was used instead of nonwoven fabric.

The dimension change (in plane) of polymer electrolyte membrane R4 was measured. The result is shown in Table 3.

Example 22

Production of Polymer Electrolyte Membrane:

Polymer electrolyte membrane R5 was obtained in the same manner as in Example 18 except that polymer Q4 was used instead of polymer Q1.

The dimension change (in plane) of polymer electrolyte membrane R5 was measured. The result is shown in Table 3.

Example 23

Production of Polymer Electrolyte Membrane:

Polymer electrolyte membrane R6 was obtained in the same manner as in Example 21 except that polymer Q4 was used instead of polymer Q3.

The dimension change (in plane) of polymer electrolyte membrane R6 was measured. The result is shown in Table 3.

Example 24

Production of Polymer Electrolyte Membrane:

Polymer electrolyte membrane R7 was obtained in the same manner as in Example 18 except that polymer Q5 was used instead of polymer Q1.

The dimension change (in plane) of polymer electrolyte membrane R7 was measured. The result is shown in Table 3.

Example 25

Production of Polymer Electrolyte Membrane:

Polymer electrolyte membrane R8 was obtained in the same manner as in Example 18 except that polymer Q6 was used instead of polymer Q1.

The dimension change (in plane) of polymer electrolyte membrane R8 was measured. The result is shown in Table 3.

Example 26

Production of Polymer Electrolyte Membrane:

Polymer electrolyte membrane R9 was obtained in the same manner as in Example 21 except that polymer Q6 was used instead of polymer Q3.

The dimension change (in plane) of polymer electrolyte membrane R9 was measured. The result is shown in Table 3.

Example 27

Production of Polymer Electrolyte Membrane:

Polymer electrolyte membrane R10 was obtained in the same manner as in Example 18 except that a solution (solid content: 20 mass %) of a commercially available fluorinated proton conductive polymer (Nafion R, manufactured by Dupont) was used instead of liquid composition S1.

The dimension change (in plane) of polymer electrolyte membrane R10 was measured. The result is shown in Table 3.

Example 28

Production of Polymer Electrolyte Membrane:

Liquid composition S1' was applied to an ETFE sheet (tradename: AFLEX 100N, manufactured by Asahi Glass Company, Limited, thickness: 100 μm) by die coating and dried at 80° C. for 30 minutes, followed by annealing at 150° C. for 30 minutes to form polymer electrolyte membrane R11 with a thickness of 25 μm.

The dimension change (in plane) of polymer electrolyte membrane R11 was measured. The result is shown in Table 3.

Example 29

Production of Polymer Electrolyte Membrane:

Polymer electrolyte membrane R12 was obtained in the same manner as in Example 18 except that polymer Q7 was used instead of polymer Q1.

The dimension change (in plane) of polymer electrolyte membrane R12 was measured. The result is shown in Table 3.

Using the membrane/electrode assembly, a polymer electrolyte fuel cell was prepared, and the initial cell voltage was measured. The result is shown in Table 4.

Example 31

A membrane/electrode assembly was obtained in the same manner as in Example 30 except that polymer Q1 used to form a catalyst layer was changed to polymer Q2 and polymer electrolyte membrane R1 was changed to polymer electrolyte membrane R2.

Using the membrane/electrode assembly, a polymer electrolyte fuel cell was prepared, and the initial cell voltage was measured. The result is shown in Table 4.

Example 32

A membrane/electrode assembly was obtained in the same manner as in Example 30 except that polymer Q1 used to

TABLE 3

| | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|
| Polymer electrolyte membrane | R1 | R2 | R3 | R4 | R5 | R6 | R7 | R8 | R9 | R10 | R11 | R12 |
| Fluorinated proton conductive polymer | Q1 | Q2 | Q3 | Q3 | Q4 | Q4 | Q5 | Q6 | Q6 | Commercial product | Q1 | Q7 |
| Glass transition temperature (° C.) | 126 | 130 | 138 | 138 | 123 | 123 | 131 | 122 | 122 | 106 | 126 | 94 |
| Fluorinated reinforcing material | Non-woven fabric | Non-woven fabric | Non-woven fabric | Porous body | Non-woven fabric | Porous body | Non-woven fabric | Non-woven fabric | Porous body | Non-woven fabric | Nil | Non-woven fabric |
| Fiber size of continuous fibers (μm) | 7 | 7 | 7 | — | 7 | — | 7 | 7 | — | 7 | — | 7 |
| Thickness of reinforcing material (μm) | 20 | 20 | 20 | 17.5 | 20 | 17.5 | 20 | 20 | 17.5 | 20 | — | 20 |
| Thickness of non-reinforcing material (μm) | 5 | 5 | 5 | 5 | 5 | 5 | 5 | 5 | 5 | 5 | — | 5 |
| Thickness of electrolyte membrane (μm) | 30 | 30 | 30 | 27.5 | 30 | 27.5 | 30 | 30 | 27.5 | 30 | 25 | 30 |
| Dimension change (in plane) (%) | 11 | 12 | 12 | 12 | 11 | 11 | 9 | 10 | 9 | 12 | 35 | 27 |

Example 30

Production of Membrane/Electrode Assembly:

Polymer Q1 was added to a solvent mixture of ethanol and water (ethanol/water=1/1 mass ratio) and dissolved therein in a flask with a reflux function with stirring at 60° C. for 16 hours, to obtain a liquid composition having a solid content concentration of 9 mass %.

Separately from the above, water and ethanol were added in this order to platinum supported on carbon to obtain a dispersion of catalyst (solid content concentration: 9 mass %) dispersed in a mixed dispersion medium of ethanol and water (ethanol/water=1/1 mass ratio).

The liquid composition and the catalyst dispersion were mixed in a ratio of liquid composition/catalyst dispersion=1/2 (mass ratio) to prepare a liquid for forming a catalyst layer.

The liquid for forming a catalyst layer was applied to both surfaces of polymer electrolyte membrane R1 by die coating and dried to form a catalyst layer having a thickness of 10 μm and an amount of platinum supported of 0.2 mg/cm². Carbon cloth as a gas diffusion layer was disposed on both outside surfaces of the catalyst layers to obtain a membrane/electrode assembly.

form a catalyst layer was changed to polymer Q3 and polymer electrolyte membrane R1 was changed to polymer electrolyte membrane R3.

Using the membrane/electrode assembly, a polymer electrolyte fuel cell was prepared, and the initial cell voltage was measured. The result is shown in Table 4.

Example 33

A membrane/electrode assembly was obtained in the same manner as in Example 32 except that polymer electrolyte membrane R3 was changed to polymer electrolyte membrane R4.

Using the membrane/electrode assembly, a polymer electrolyte fuel cell was prepared, and the initial cell voltage was measured. The result is shown in Table 4.

Example 34

A membrane/electrode assembly was obtained in the same manner as in Example 30 except that polymer Q1 used to form a catalyst layer was changed to polymer Q4 and polymer electrolyte membrane R1 was changed to polymer electrolyte membrane R5.

Using the membrane/electrode assembly, a polymer electrolyte fuel cell was prepared, and the initial cell voltage was measured. The result is shown in Table 4.

Example 35

A membrane/electrode assembly was obtained in the same manner as in Example 34 except that polymer electrolyte membrane R5 was changed to polymer electrolyte membrane R6.

Using the membrane/electrode assembly, a polymer electrolyte fuel cell was prepared, and the initial cell voltage was measured. The result is shown in Table 4.

Example 36

A membrane/electrode assembly was obtained in the same manner as in Example 30 except that polymer electrolyte membrane R1 was changed to polymer electrolyte membrane R7.

Example 39

A membrane/electrode assembly was obtained in the same manner as in Example 30 except that polymer Q1 used to form a catalyst layer was changed to a commercially available fluorinated proton conductive polymer (Nafion R, manufactured by Dupont) and polymer electrolyte membrane R1 was changed to polymer electrolyte membrane R10.

Using the membrane/electrode assembly, a polymer electrolyte fuel cell was prepared, and the initial cell voltage was measured. The result is shown in Table 4.

Example 40

A membrane/electrode assembly was obtained in the same manner as in Example 30 except that polymer electrolyte membrane R1 was changed to polymer electrolyte membrane R11.

Using the membrane/electrode assembly, a polymer electrolyte fuel cell was prepared, and the initial cell voltage was measured. The result is shown in Table 4.

TABLE 4

| Membrane/electrode assembly | | Ex. 30 | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|---|---|
| Polymer electrolyte membrane | | R1 | R2 | R3 | R4 | R5 | R6 | R7 | R8 | R9 | R10 | R11 |
| Initial cell voltage (mV) | Electric current density 0.1 A/cm$^2$ | 800 | 800 | 800 | 800 | 800 | 800 | 800 | 795 | 800 | 795 | 810 |
| | Electric current density 1 A/cm$^2$ | 640 | 650 | 650 | 640 | 640 | 640 | 600 | 610 | 620 | 550 | 680 |

Using the membrane/electrode assembly, a polymer electrolyte fuel cell was prepared, and the initial cell voltage was measured. The result is shown in Table 4.

Example 37

A membrane/electrode assembly was obtained in the same manner as in Example 30 except that polymer Q1 used to form a catalyst layer was changed to polymer Q6 and polymer electrolyte membrane R1 was changed to polymer electrolyte membrane R8.

Using the membrane/electrode assembly, a polymer electrolyte fuel cell was prepared, and the initial cell voltage was measured. The result is shown in Table 4.

Example 38

A membrane/electrode assembly was obtained in the same manner as in Example 37 except that polymer electrolyte membrane R8 was changed to polymer electrolyte membrane R9.

Using the membrane/electrode assembly, a polymer electrolyte fuel cell was prepared, and the initial cell voltage was measured. The result is shown in Table 4.

INDUSTRIAL APPLICABILITY

By using the polymer electrolyte membrane and the membrane/electrode assembly of the present invention, a high output and long life polymer electrolyte fuel cell can be obtained.

The entire disclosure of Japanese Patent Application No. 2006-336878 filed on Dec. 14, 2006 including specification, claims, drawings and summary is incorporated herein by reference in its entirety.

What is claimed is:

1. A polymer electrolyte membrane for polymer electrolyte fuel cells, which comprises a fluorinated proton conductive polymer and a fluorinated reinforcing material, wherein the fluorinated proton conductive polymer satisfies the following conditions (i) and (ii):

(i) the proton conductivity is at least 0.06 S/cm in an atmosphere at a temperature of 80° C. under a relative humidity of 50%, and (ii) it is a polymer having repeating units based on a monomer having a group (a) with an equivalent weight of at most 400 g per 1 mol of ionic groups and repeating units based on a perfluoromonomer (except for the above monomer), wherein said group (α) is represented by the following structural formula:

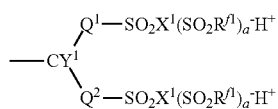

wherein $Q^1$ is a perfluoroalkylene group or a perfluoroalkylene group having an etheric oxygen atom, $Q^2$ is a single bond, a perfluoroalkylene group, or a perfluoroalkylene group having an etheric oxygen atom, $R^{f1}$ is a perfluoroalkyl group or a perfluoroalkyl group having an etheric oxygen atom, $X^1$ is an oxygen atom, a nitrogen atom or a carbon atom, "a" is 0 when $X^1$ is an oxygen atom, 1 when $X^1$ is a nitrogen atom, or 2 when $X^1$ is a carbon atom, and $Y^1$ is a fluorine atom or a monovalent perfluoroorganic group.

2. The polymer electrolyte membrane for polymer electrolyte fuel cells according to claim 1, wherein the proton conductivity is at least 0.08 S/cm in an atmosphere at a temperature of 80° C. under a relative humidity of 50%.

3. The polymer electrolyte membrane for polymer electrolyte fuel cells according to claim 1, wherein the fluorinated proton conductive polymer has an ion exchange capacity of from 0.5 to 2.0 meq/g dry polymer.

4. The polymer electrolyte membrane for polymer electrolyte fuel cells according to claim 1, wherein the fluorinated proton conductive polymer has a glass transition point of at least 120° C.

5. A membrane/electrode assembly for polymer electrolyte fuel cells, which comprises the polymer electrolyte membrane for polymer electrolyte fuel cells as defined in claim 1 interposed between an anode and a cathode.

6. The polymer electrolyte membrane for polymer electrolyte fuel cells according to claim 1, wherein $Q^1$ is a perfluoroalkylene group having an etheric oxygen atom.

7. The polymer electrolyte membrane for polymer electrolyte fuel cells according to claim 1, wherein $Q^2$ is a perfluoroalkylene group having an etheric oxygen atom.

8. The polymer electrolyte membrane for polymer electrolyte fuel cells according to claim 1, wherein $Q^1$ and $Q^2$ are each a perfluoroalkylene group having an etheric oxygen atom.

9. The polymer electrolyte membrane for polymer electrolyte fuel cells according to claim 1, wherein at least one of $Q^1$ and $Q^2$ are each a perfluoroalkylene group having an etheric oxygen atom and said oxygen atom is inserted in the carbon atom-carbon atom bond of the perfluoroalkylene group.

10. The polymer electrolyte membrane for polymer electrolyte fuel cells according to claim 1, wherein at least one of $Q^1$ and $Q^2$ are each a perfluoroalkylene group having an etheric oxygen atom and said oxygen atom is inserted into the terminal of the carbon atom bond.

11. The polymer electrolyte membrane for polymer electrolyte fuel cells according to claim 1, wherein said perfluoroalkylene group is linear.

12. The polymer electrolyte membrane for polymer electrolyte fuel cells according to claim 1, wherein said perfluoroalkylene group is branched.

13. The polymer electrolyte membrane for polymer electrolyte fuel cells according to claim 1, wherein said perfluoroalkylene has 1 to 6 carbon atoms.

14. The polymer electrolyte membrane for polymer electrolyte fuel cells according to claim 1, wherein $Q^2$ is a $C_{1-6}$ perfluoroalkylene group or a $C_{1-6}$ perfluoroalkylene group having an etheric oxygen atom.

15. The polymer electrolyte membrane for polymer electrolyte fuel cells according to claim 1, wherein at least one of $Q^1$ and $Q^2$ is a $C_{1-6}$ perfluoroalkylene group having an etheric oxygen atom.

16. The polymer electrolyte membrane for polymer electrolyte fuel cells according to claim 1, wherein the —$SO_2X^1(SO_2R^{f1})_a^-H^+$ group is selected from the group consisting of a sulfonic group having the formula —$SO_3^-H^+$ group, a sulfonimide group having the formula —$SO_2N(SO_2R^{f1})^-H^+$, and a sulfonmethide group having the formula —$SO_2C(SO_2R^{f1})_2^-H^+$ group.

17. The polymer electrolyte membrane for polymer electrolyte fuel cells according to claim 16, wherein said perfluoroalkyl group as $R^{f1}$ may be linear or branched and has from 1 to 6 carbon atoms.

18. The polymer electrolyte membrane for polymer electrolyte fuel cells according to claim 16, wherein said perfluoroalkyl group as $R^{f1}$ is a perfluoromethyl group or a perfluoroethyl group.

19. The polymer electrolyte membrane for polymer electrolyte fuel cells according to claim 16, wherein the —$SO_2X^1(SO_2R^{f1})_a^-H^+$ group is a sulfonmethide group, wherein the two $R^{f1}$ are the same group.

20. The polymer electrolyte membrane for polymer electrolyte fuel cells according to claim 16, wherein the —$SO_2X^1(SO_2R^{f1})_a^-H^+$ group is a sulfonmethide group, wherein the two $R^{f1}$ are different groups.

21. The polymer electrolyte membrane for polymer electrolyte fuel cells according to claim 1, wherein $Y^1$ is a fluorine atom.

22. The polymer electrolyte membrane for polymer electrolyte fuel cells according to claim 1, wherein $Y^1$ is monovalent perfluoroorganic group and said monovalent perfluoroorganic group is a $C_{1-6}$ linear perfluoroalkyl group or a $C_{1-6}$ linear perfluoroalkyl group having an etheric oxygen atom.

23. The polymer electrolyte membrane for polymer electrolyte fuel cells according to claim 1, wherein said repeating units based on a perfluoromonomer is a repeating unit based on tetrafluoroethylene.

24. The polymer electrolyte membrane for polymer electrolyte fuel cells according to claim 1, wherein said fluorinated proton conductive polymer further comprises at least one monomer selected from the group consisting of chlorotrifluoroethylene, vinylidene fluoride, hexafluoropropylene, trifluoroethylene, vinyl fluoride, ethylene, a compound (n1), a compound (n2), a compound (n3), and a compound (n4), wherein $$CF_2=CFOR^{f2} \quad (n1)$$

$$CH_2=CHR^{f3} \quad (n2)$$

$$CH_2=CHCH_2R^{f3} \quad (n3)$$

wherein $R^{f2}$ is a $C_{1-12}$ perfluoroalkyl group or a $C_{1-12}$ perfluoroalkyl group having at least one etheric oxygen atom, and $R^{f3}$ is a $C_{1-12}$ perfluoroalkyl group $$CF_2=CFOCF_2CFY^2Q^3SO_2X^2(SO_2R^{f4})_b^-H^+ \quad (n4)$$

wherein $Q^3$ is a single bond a perfluoroalkylene group, or a perfluoroalkylene group having at least one etheric oxygen atom, $R^{f4}$ is a perfluoroalkyl group or a perfluoroalkyl group having an etheric oxygen atom, $X^2$ is an oxygen atom, a nitrogen atom or a carbon atom, b is 0 when $X^2$ is an oxygen atom, 1 when $X^2$ is a nitrogen atom and 2 when $X^2$ is a carbon atom, and $Y^2$ is a fluorine atom or a monovalent perfluoroorganic group.

* * * * *